No. 794,750. PATENTED JULY 18, 1905.
C. H. SLACK.
SAW FILING MACHINE.
APPLICATION FILED SEPT. 22, 1903.
7 SHEETS—SHEET 1.
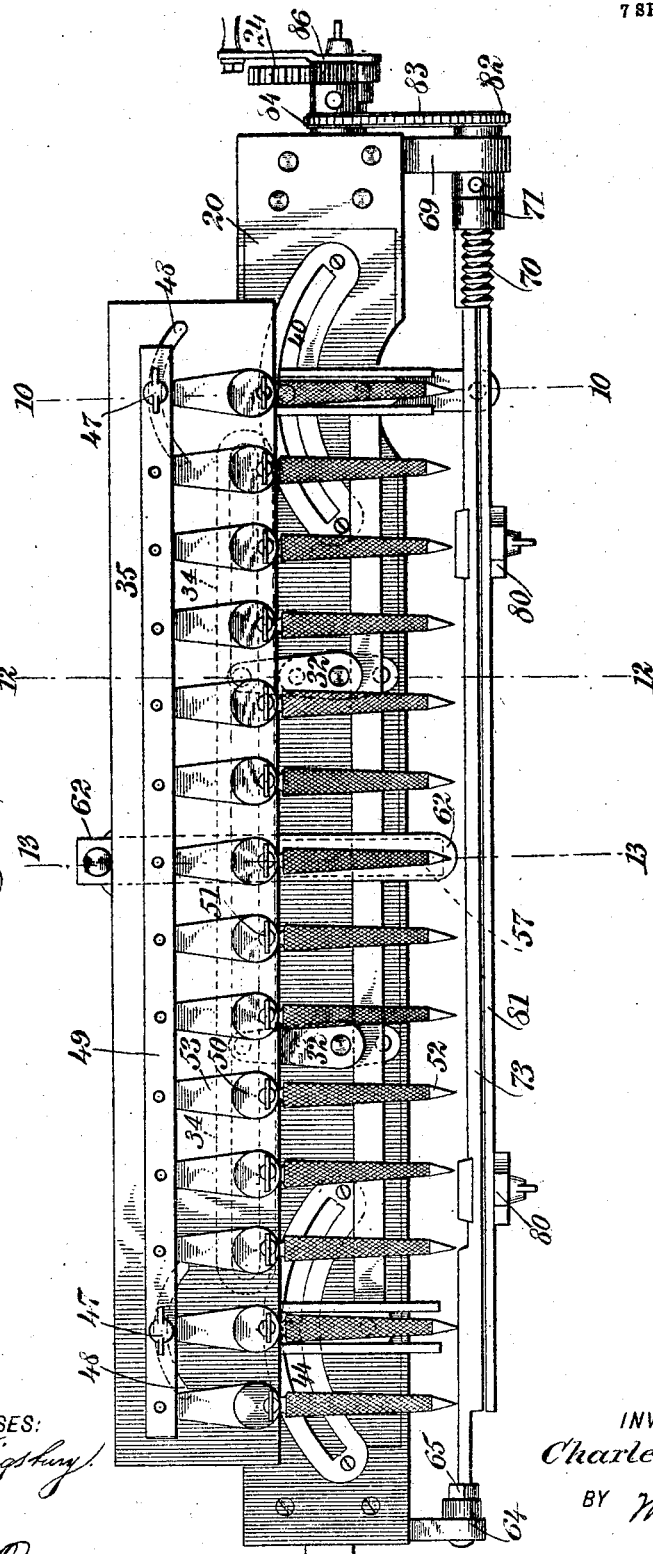
WITNESSES:
G. P. Kingsbury
Isaac B. Owens
INVENTOR
Charles H. Slack
BY Munn
ATTORNEYS No. 794,750. PATENTED JULY 18, 1905.
C. H. SLACK.
SAW FILING MACHINE.
APPLICATION FILED SEPT. 22, 1903.
7 SHEETS—SHEET 2.
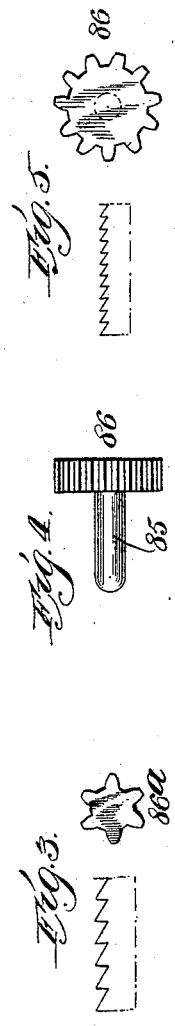
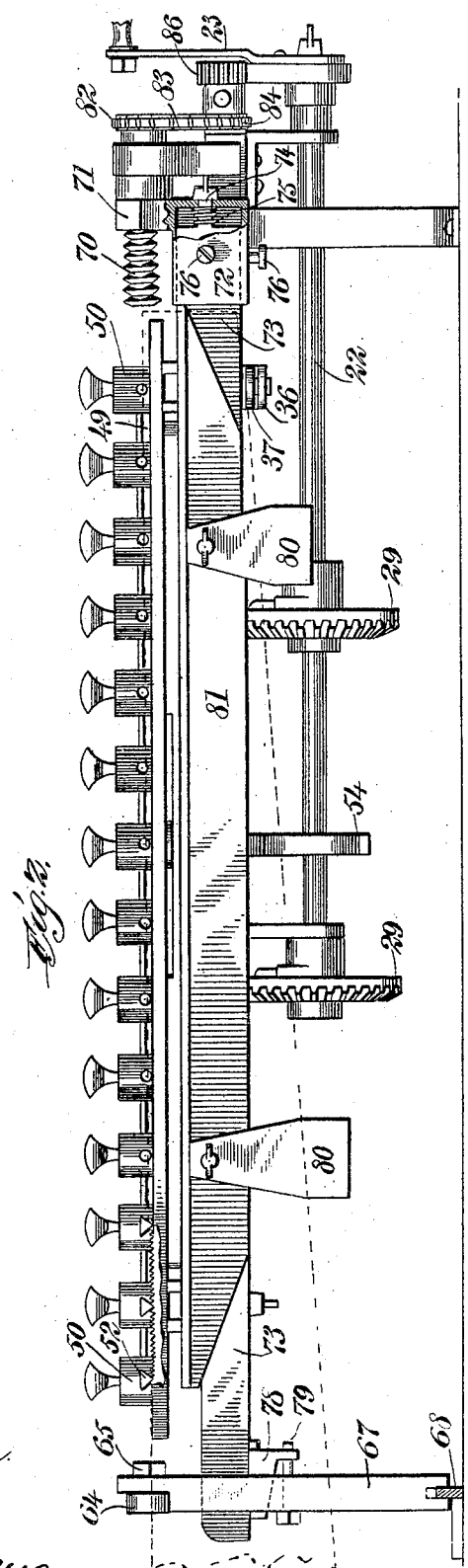
WITNESSES:
G. P. Kingsbury
Isaac B. Owens
INVENTOR
Charles H. Slack
BY
Munn
ATTORNEYS No. 794,750. PATENTED JULY 18, 1905.
C. H. SLACK.
SAW FILING MACHINE.
APPLICATION FILED SEPT. 22, 1903.
7 SHEETS—SHEET 3.
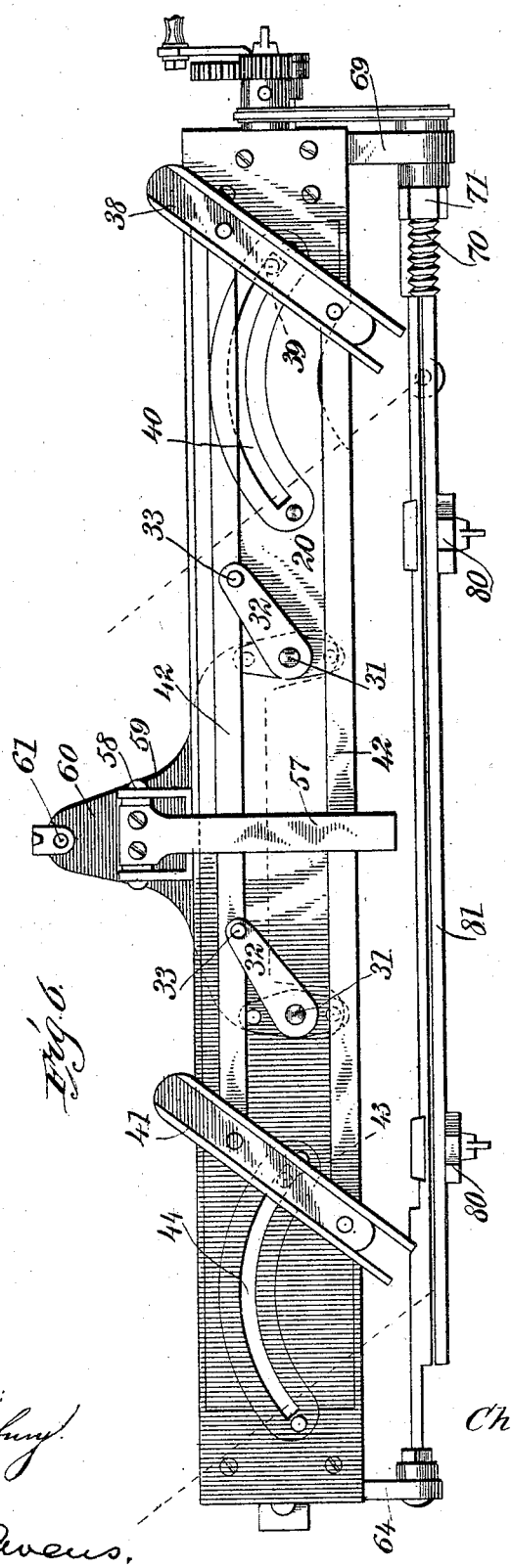
WITNESSES:
G. P. Kingsbury
Isaac B. Owens.
INVENTOR
Charles H. Slack
BY
Mueller
ATTORNEYS

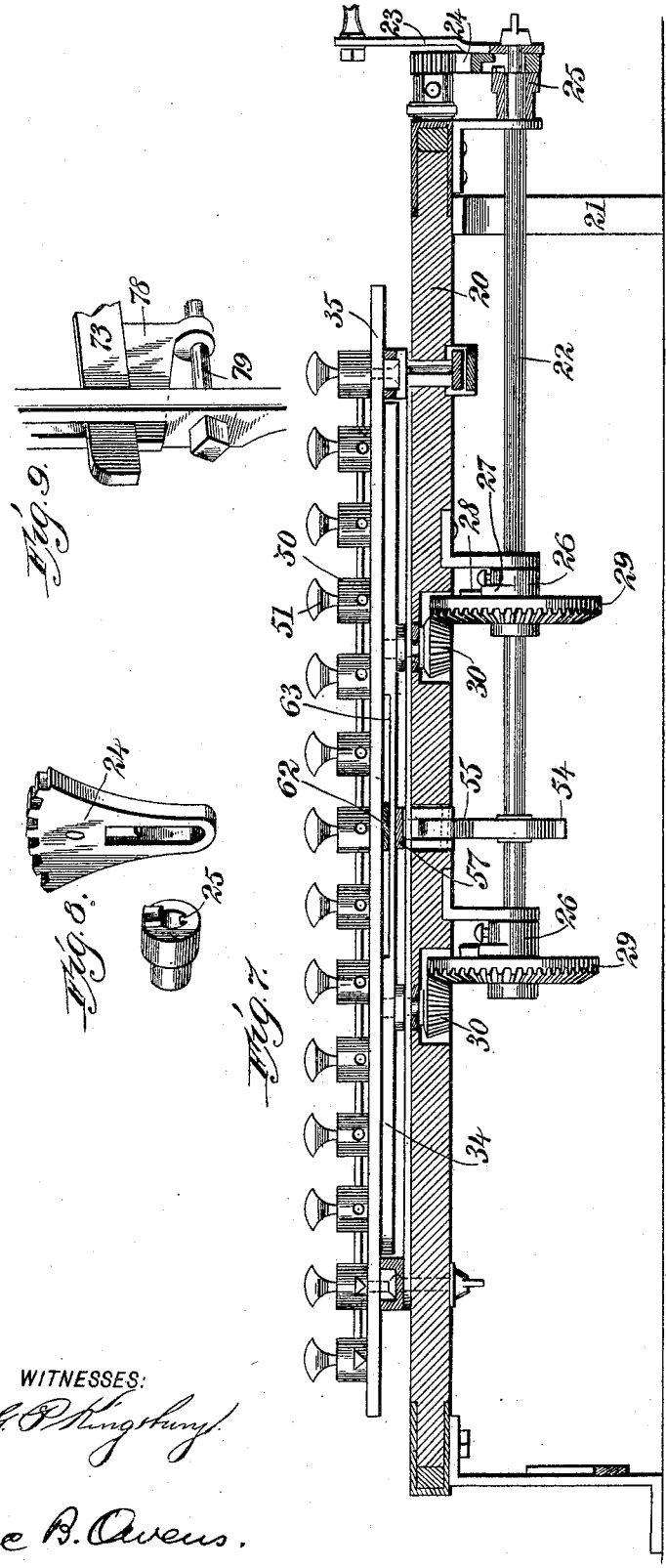

No. 794,750. PATENTED JULY 18, 1905.
C. H. SLACK.
SAW FILING MACHINE.
APPLICATION FILED SEPT. 22, 1903.
7 SHEETS—SHEET 5.
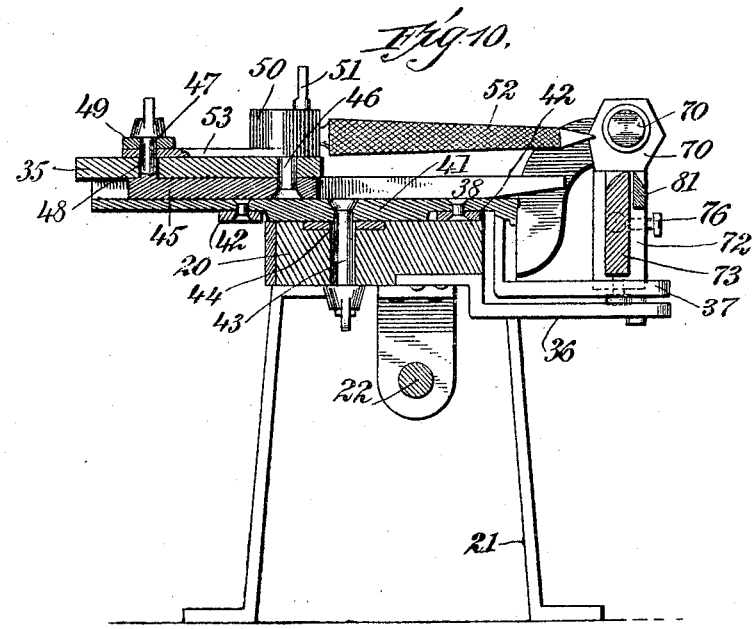
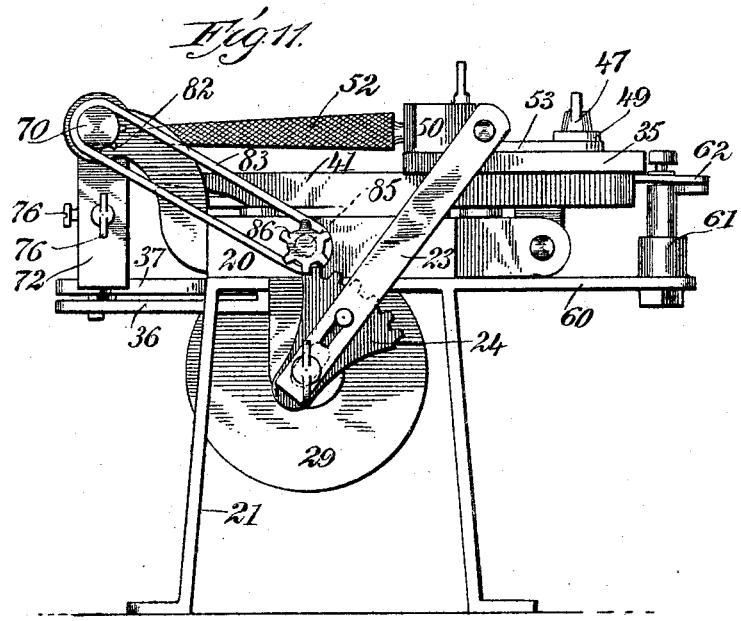
WITNESSES:
INVENTOR
Charles H. Slack
BY
ATTORNEYS No. 794,750. PATENTED JULY 18, 1905.
C. H. SLACK.
SAW FILING MACHINE.
APPLICATION FILED SEPT. 22, 1903.
7 SHEETS—SHEET 6.
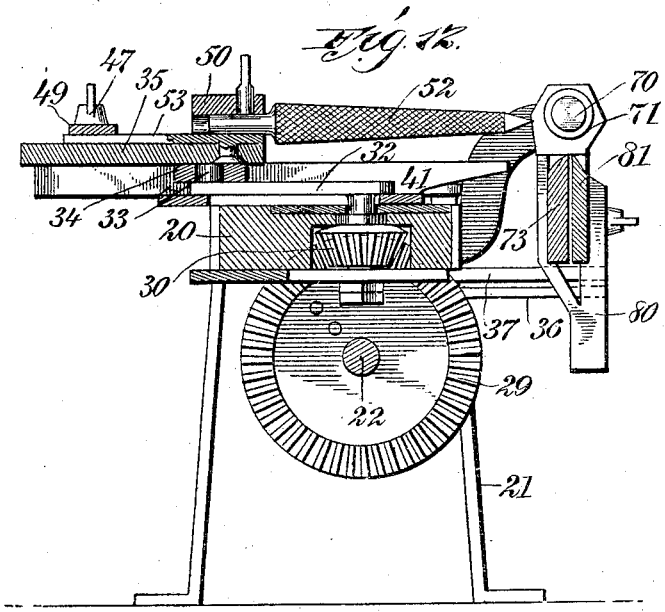
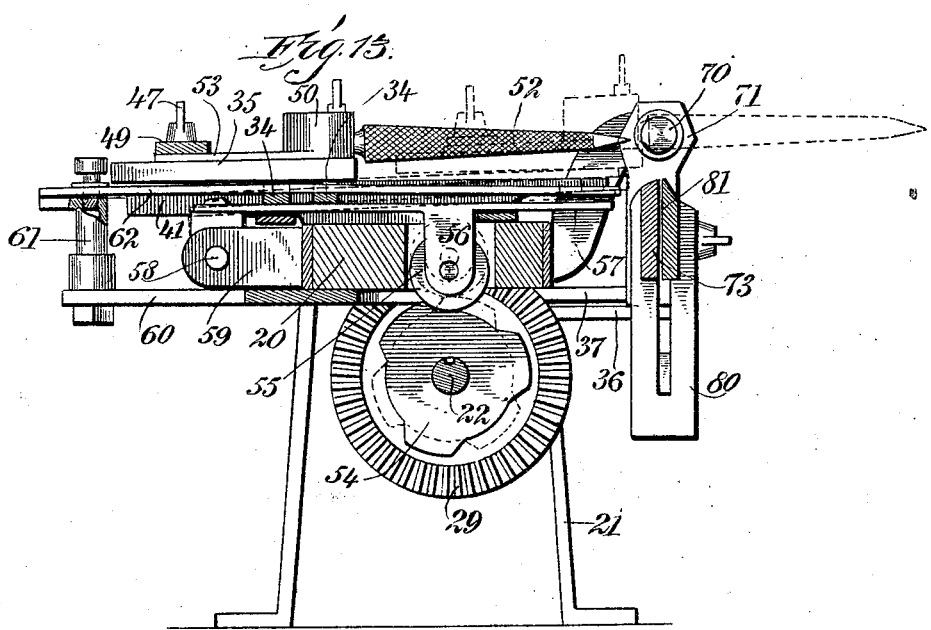
WITNESSES:
G. P. Kingsbury
Isaac P. Owens.
INVENTOR
Charles H. Slack
BY Munn
ATTORNEYS No. 794,750. PATENTED JULY 18, 1905.
C. H. SLACK.
SAW FILING MACHINE.
APPLICATION FILED SEPT. 22, 1903.
7 SHEETS—SHEET 7.
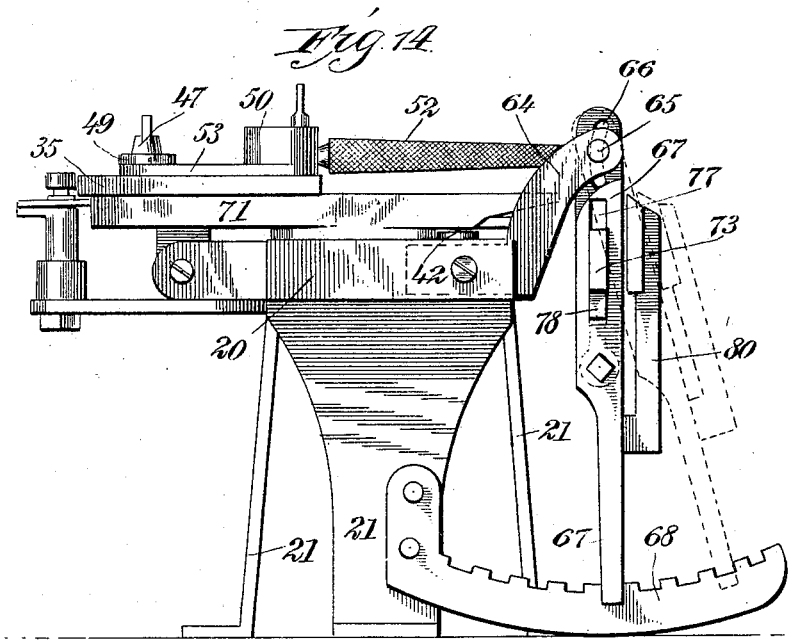
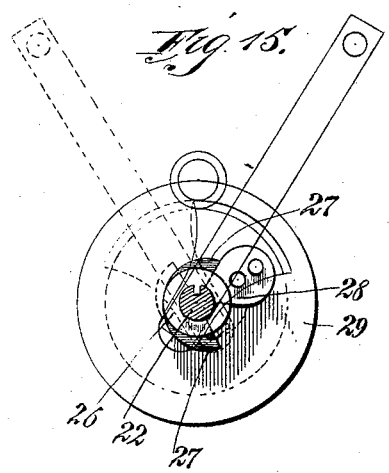
WITNESSES:
INVENTOR
Charles H. Slack
BY
ATTORNEYS No. 794,750.                                                            Patented July 18, 1905.

UNITED STATES PATENT OFFICE.

CHARLES H. SLACK, OF NEW YORK, N. Y., ASSIGNOR OF ONE-HALF TO GEORGE S. ROBINSON, OF TRENTON, NEW JERSEY.

SAW-FILING MACHINE.

SPECIFICATION forming part of Letters Patent No. 794,750, dated July 18, 1905.

Application filed September 22, 1903. Serial No. 174,148.

*To all whom it may concern:*

Be it known that I, CHARLES H. SLACK, a citizen of the United States, and a resident of the city of New York, borough of Manhattan, in the county and State of New York, have invented a new and Improved Saw-Filing Machine, of which the following is a full, clear, and exact description.

This invention relates to a machine for filing saws; and by this means a saw may be placed in the machine and the machine adjusted so that by driving the machine the saw will be accurately and uniformly filed throughout its length.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the invention. Fig. 2 is a side elevation thereof, partly in section. Fig. 3 is a detail view of a pinion for the saw-feeding device. Fig. 4 is a side view of a second pinion for the saw-feeding device. Fig. 5 is a face view of the pinion shown in Fig. 4. Fig. 6 is a plan view of the machine with the carriage removed. Fig. 7 is a longitudinal section of the machine. Fig. 8 is a detail perspective of the device for fastening the crank on the drive-shaft. Fig. 9 is a detail perspective of the means for adjusting the saw. Fig. 10 is a cross-section on the line 10 10 of Fig. 1. Fig. 11 is an end elevation. Fig. 12 is a cross-section on the line 12 12 of Fig. 1. Fig. 13 is a cross-section on the line 13 13 of Fig. 1. Fig. 14 is an elevation of the end opposite that shown in Fig. 11; and Fig. 15 is a detail view showing the manner of connecting the driving bevel-gears with the drive-shaft, this view also indicating the relation of these parts to the improved sector and pinion for operating the saw-feed.

The apparatus comprises a table or body 20, having legs 21 supporting it horizontally, as shown. Mounted longitudinally of the table and beneath the same is a longitudinally-extending drive-shaft 22, with which are connected a crank-handle 23 and a toothed sector 24, this connection being effected through the medium of a collar 25. (See Fig. 8.) Fastened to the said shaft 22 are two collars 26, which, as best shown in Fig. 15, have projections 27 thereon, and between these projections are located fingers 28, fastened, respectively, to the large beveled driving-gears 29. By this arrangement the shaft 22 is allowed a certain turning movement independently of the gears 29; but when one of the lugs or projections 27 strikes the finger 28 the shaft and gear become fast. By means of this device as the direction of rotation of the drive-shaft is reversed to reverse the movement of the saw-holder the shaft and the attached sector 24 are allowed a certain movement independently of the gear 29. This allows the sector to reach such a position with respect to the gear 86 and the devices for feeding the saw as corresponds with the proper position of the saw with respect to the files, and thus insures that the files move through the spaces between the saw-teeth as contradistinguished from striking the teeth themselves. In short, this arrangement and a proper proportionment of the parts permit reversing the saw movement without disturbing the correct relation between the saw-teeth and the files.

Mounted in the table 20 are two bevel-gears 30, respectively meshed with the gears 29, said gears being carried on short vertical shafts 31, to the upper ends of which are attached the crank-arms 32. These arms have upwardly-extending pins 33 at their free ends, said pins playing in a longitudinally-extending guide or slide way 34, fast to the under side of the file-carriage 35. (See dotted lines, Fig. 1, and full lines, Figs. 12 and 13.) The file-carriage lies over the table 20 and carries the gang of files, as will be hereinafter fully set forth.

As best shown in Fig. 10, an outwardly-extending arm 36 is carried by the table 20, and said arm has pivoted to its outer ends a swinging arm 37. This arm extends inward and rearward and has a guide 38 fast thereto, this guide lying over the table 20, as best shown in Fig. 6, and carrying a clamping-screw 39, which plays in an arc-shaped slot 40, formed in the table 20, as shown. A corresponding guide 41 is connected with the guide 38 by parallel links 42, this guide also having a clamping-screw 43, which plays in a slot 44, formed in the table 20 and similar to the slot 40. By operating the clamping-screws 39 and 43 the guides 38 and 41 may be held at any desired adjustment, and these guides are caused always to assume the same relative position by the links 42.

On the under side of the file-carriage 35 two runners 45 are located, these being pivoted to the carriage at the points 46 and having their free ends provided with clamping-screws 47, which work through arc-shaped slots 48, formed in the carriage, the runners being connected by a link 49, causing the runners always to assume the same relative position. As the cranks 32 swing over the table 20 their pins 33, working in the guide 34, cause the carriage 35 to move transversely over the table 20, and the adjustment of the guides 38 and 41 and the runners 45 cause this transverse movement of the table to take any desired angle to the longitudinal axis of the machine. The file-holders 50 have set-screws 51 therein to hold the files 52. These holders 50 are pivoted on the carriage 35 and have arms 53 connected to the holders and to the link 49. When, therefore, the runners 45 are adjusted to adjust the inclination of the movement of the file-carriage, a corresponding adjustment of the files takes place, and this transverse movement of the carriage is therefore always longitudinal of the files, so as to give the files the proper movement. The two cranks 32 equally distribute the driving motion over the carriage and prevent the same from binding in the guides.

Fastened to the drive-shaft 22 intermediate the gears 29 is a cam 54, which coacts with a roller 55, carried in downwardly-depending brackets 56 on a transversely-extending lifter 57, said lifter being fulcrumed at the point 58 in a rearwardly and horizontally projecting bracket 59. Projecting rearwardly from the table 20 is an arm 60, carrying a vertical stud 61, to which is fastened a spring 62. This spring extends forwardly along the file-carriage 35 and through orifices 63, formed in the longitudinal guide 34 of said carriage. The spring 62 extends forward over the lifter 57 and tends to hold the file-carriage with its guide 34 bearing uniformly on the lifter 57. The rotation of the cam 54 periodically raises the file-carriage through the medium of the lifter 57. The purpose of this is to lift the files clear of the saw after the files have moved forward. During the forward movement the files act on the saw, and during the return movement the files are lifted clear thereof. The spring 62 assists the filing action by causing the files to bear on the saw with a steady yet yielding pressure when the lifter 57 is not in operation.

Projecting forward and upward from the left-hand end of the table 20 is a bracket 64, carrying a pin or screw 65, which is fitted in a slot 66, formed in an arm 67. Said arm 67 extends downward and has a notched lower end coacting with a toothed quadrant 68. The arm 67 is capable of limited vertical movement, and it may therefore be adjusted as indicated in Fig. 14, whereby to vary the inclination of the saw to the files 52. After the desired adjustment is attained the screw 65 may be tightened to hold the arm 67 rigid. From the end of the table opposite the bracket 64 a bracket 69 extends upward and forward and carries revolubly a feed-screw 70. On said screw works a nut 71, this nut carrying (see Fig. 2) a box 72, in which is fitted loosely the right-hand end of a bar 73, yieldingly connected with the walls of the box through the medium of a stud 74 and spring 75. 76 indicates set-screws for rigidly connecting the bar 73 and box 72 whenever said connection may be desired. The bar 73 extends along the front of the machine and is mounted loosely in a longitudinal slot 77, formed in the arm 67. 78 indicates a wedge bearing under the bar 73, and 79 indicates a screw for drawing up this wedge, thereby adjusting the left-hand end of the bar vertically. Two U-shaped brackets 80 are attached to the bar 73 and carry a clamp 81, which extends across the front of the machine opposite the bar 73 and coacts with this bar to clamp the saw, as indicated by the broken lines in Fig. 2. The feed-screw 70 has a sprocket-wheel 82 attached thereto. Over this wheel a chain 83 runs to a corresponding wheel 84 on a short shaft 85, suitably mounted on the table 20. Said shaft 85 also carries a pinion 86, and this is adapted to mesh with the before-mentioned sector 24, fastened on the drive-shaft 22.

In operating the machine the files will be placed on the carriage at a distance apart equal to the effective length of the feed-screw 70, so that when the saw has been moved this distance the files will have covered the entire length of the saw. After properly adjusting the files and clamping the saw between the elements 73 and 81 it is only necessary to impart a continuous rotary movement to the shaft 22, which drives the file-carriage across the machine and periodically operates the feed-screw 70, which advances the saw. The operation of the feed-screw is timed to occur when the carriage is moving the files away from the saw, at which period the files are raised out of contact with the saw and may therefore move back idly. It will be observed that three complete movements of the carriage take place for every feeding movement of the screw 70. If after going over the saw once as described it is desired to repeat this operation, it is only necessary to reverse the direction of the drive-shaft 22, whereupon the saw is moved back toward the position it first occupied. By changing the pinion 86 the length of each feeding movement of the saw may be regulated. In Figs. 3 and 5 I have illustrated the pinion 86 and a different-sized pinion $86^a$, adapted, respectively, for coarse and fine saw-teeth.

Various changes in the form, proportions, and minor details of my invention may be resorted to at will without departing from the spirit and scope thereof. Hence I consider myself entitled to all such variations as may lie within the scope of my claims.

Having thus described my invention, I claim as new and desire to secure by Letters Patent—

1. In a saw-filing machine, the combination of a saw-holder, a nut connected therewith, a screw engaging the nut, a gear connected with the screw, a second gear constructed to periodically engage the first gear, means for mounting and periodically operating the file, means for moving the file out of engagement with the saw upon the feed movement thereof, and connections between the two last-named means and the second-named gear to cause the parts to operate in unison.

2. In a saw-filing machine the combination with means for mounting and operating a file, of a saw-carrier, a nut and screw one of which is connected with the saw-carrier, gearing connected to the other, a revoluble shaft with which said gearing is connected, a gear on the revoluble shaft, and a sector arranged periodically to operate said gear.

3. In a saw-filing machine the combination with means for mounting and operating a file, of a saw-carrier, a nut and screw one of which is connected with the saw-carrier, gearing connected to the other, a revoluble shaft with which said gearing is connected, a gear on the revoluble shaft, a sector arranged periodically to operate said gear, a shaft on which the sector is mounted, and means connected to said shaft whereby to operate the file.

4. In a saw-filing machine the combination with means for mounting and operating a file, of a saw-carrier, a nut and screw one of which is connected with the saw-carrier, gearing connected to the other, a revoluble shaft with which said gearing is connected, a gear on the revoluble shaft, a sector arranged to periodically operate said gear, a shaft on which the sector is mounted, and means connected to said shaft whereby to operate the file, said file-operating means including devices for periodically moving the file out of engagement with the saw for the purpose specified.

5. In a saw-filing machine the combination of means for mounting a file, a rotary drive-shaft having two spaced projections thereon, a gear loose on the shaft, a finger fast on the gear and bearing loosely between the projections to allow the shaft a certain movement independent of the gear, means connected with the gear for operating the file-mounting means, and means for mounting and periodically moving a saw.

6. In a saw-filing machine the combination with means for mounting and operating a file, of a saw-holder having a part with a slot therein, a supporting part loosely fitted in the slot, movably to mount the saw-holder, the saw-holder being also capable of swinging above an axis extending longitudinally of the saw-holder and of the saw when held thereon whereby to adjust the inclination of a plane of the saw to the file, a toothed sector concentric to the swinging movement of the saw-holder, and a member connected to the saw-holder and adapted adjustably to engage the sector.

7. A saw-filing machine comprising the combination with the saw-holding means of a file-carriage, means for adjustably mounting the same to travel at any angle to the saw, and means for operating the same, a plurality of angularly-adjustable file-holders mounted on the carriage, and connections between the file-holders to adjust them in unison with each other.

8. A saw-filing machine comprising the combination with a saw-holding means of a file-carriage, means for mounting and operating the same, a plurality of adjustable file-holders mounted on the carriage, and connections between the file-holders to adjust them in unison with each other, said connections comprising arms connected to the file-holders and a link extending between and pivotally connected to said arms.

9. In a saw-filing machine the combination with means for mounting and operating a file, of a movable saw-holder, a nut connected therewith, a screw engaging the nut, a gear a driving connection between the gear and screw, a second gear arranged to periodically engage the first-named gear, and connections between the second gear and the said means for mounting and operating the file.

10. In a saw-filing machine the combination of a movable saw-holder, a coacting nut and screw, one of which parts is in connection with the saw-holder, a gear connected with the other part, a mutilated gear arranged to coact with the first-named gear, means for mounting and reciprocally driving a file, means for periodically moving the file out of engagement with the saw, and connections between the two last-named means and the mutilated gear to cause the parts to operate in unison.

11. In a saw-filing machine the combination with a framing or body and means for holding and feeding the saw of two regularly-adjustable guides mounted on the body, a connection between the guides to cause them to be adjusted in unison, a file-carriage having parts running in the guides, a crank mounted under the file-carriage, means for driving the crank, a slideway on the under side of the file-carriage, the crank having a part working in the slideway, and means on the file-carriage for holding files.

In testimony whereof I have signed my name to this specification in the presence of two subscribing witnesses.

CHARLES H. SLACK.

Witnesses:
ISAAC B. OWENS,
JNO. M. RITTER.